United States Patent
Noguchi et al.

(10) Patent No.: US 10,585,587 B2
(45) Date of Patent: Mar. 10, 2020

(54) MEMORY CONTROL CIRCUITRY, MEMORY SYSTEM AND PROCESSOR SYSTEM

(71) Applicant: TOSHIBA MEMORY CORPORATION, Tokyo (JP)

(72) Inventors: Hiroki Noguchi, Kanagawa (JP); Shinobu Fujita, Tokyo (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 271 days.

(21) Appl. No.: 15/455,261

(22) Filed: Mar. 10, 2017

(65) Prior Publication Data
US 2018/0081555 A1  Mar. 22, 2018

(30) Foreign Application Priority Data
Sep. 20, 2016 (JP) .................................. 2016-183303

(51) Int. Cl.
| | |
|---|---|
| *G06F 3/06* | (2006.01) |
| *G06F 12/02* | (2006.01) |
| *G06F 11/30* | (2006.01) |
| *G06F 12/0888* | (2016.01) |
| *G06F 12/1009* | (2016.01) |

(52) U.S. Cl.
CPC .......... *G06F 3/0607* (2013.01); *G06F 3/0631* (2013.01); *G06F 3/0635* (2013.01); *G06F 3/0685* (2013.01); *G06F 11/3037* (2013.01); *G06F 12/023* (2013.01); *G06F 12/0223* (2013.01); *G06F 12/0292* (2013.01); *G06F 12/0888* (2013.01); *G06F 12/1009* (2013.01); *G06F 2212/1016* (2013.01);
(Continued)

(58) Field of Classification Search
None
See application file for complete search history.

(56) References Cited

U.S. PATENT DOCUMENTS

| | | | |
|---|---|---|---|
| 8,386,698 B2 | 2/2013 | Yeh | |
| 2012/0155160 A1* | 6/2012 | Alam | G11C 7/1042 365/158 |

(Continued)

FOREIGN PATENT DOCUMENTS

| | | |
|---|---|---|
| JP | 2011-154547 | 8/2011 |
| JP | 2015-60571 | 3/2015 |
| TW | 201003392 A | 1/2010 |

*Primary Examiner* — Jared I Rutz
*Assistant Examiner* — Marwan Ayash
(74) *Attorney, Agent, or Firm* — Oblon, McClelland, Maier & Neustadt, L.L.P.

(57) ABSTRACT

A memory control circuitry has a write destination selector to select either a volatile memory or a non-volatile memory in a first storage as a write destination, for an address area in the first storage written by a processor, a write controller to write data in the write destination selected by the write destination selector, and an access information register to register information selecting the volatile memory or the non-volatile memory as the write destination, and number-of-times information indicating how many times a page of successive addresses for the address area is switched, as both information being associated with each other. When there is a write request from the processor, the write destination selector selects the write destination based on the information registered in the access information register.

17 Claims, 11 Drawing Sheets

(52) U.S. Cl.
CPC ............... *G06F 2212/1044* (2013.01); *G06F 2212/205* (2013.01); *G06F 2212/502* (2013.01); *G06F 2212/657* (2013.01)

(56) References Cited

U.S. PATENT DOCUMENTS

| | | | |
|---|---|---|---|
| 2013/0198437 A1* | 8/2013 | Omizo | G06F 12/0246 |
| | | | 711/103 |
| 2013/0332660 A1 | 12/2013 | Talagala et al. | |
| 2014/0173268 A1* | 6/2014 | Hashimoto | G06F 11/0754 |
| | | | 713/2 |
| 2014/0189239 A1 | 7/2014 | Hum et al. | |
| 2015/0074339 A1 | 3/2015 | Chertion | |
| 2016/0196210 A1 | 7/2016 | Noguchi et al. | |

\* cited by examiner

| PHYSICAL ADDRESS | THREAD ID | PAGE SWITCHING TIMES | HYBRID ADDRESS |
|---|---|---|---|
| | | .... | |
| | | .... | |
| ... | ... | ... | ... |
| | | .... | |

| PHYSICAL ADDRESS | PTE ID | PAGE SWITCHING TIMES | | | HYBRID ADDRESS |
|---|---|---|---|---|---|
|  |  |  | .... |  |  |
|  |  |  | .... |  |  |
| ... | ... | ... | ... | ... | ... |
|  |  |  | .... |  |  |

FIG. 8

MEMORY CONTROL CIRCUITRY, MEMORY SYSTEM AND PROCESSOR SYSTEM

CROSS REFERENCE TO RELATED APPLICATIONS

This application is based upon and claims the benefit of priority from the prior Japanese Patent Application No. 2016-183303, filed on Sep. 20, 2016, the entire contents of which are incorporated herein by reference.

FIELD

Embodiments relate to memory control circuitry, a memory system, and a processor system.

BACKGROUND

A processor to be used for a portable information terminal is required to consume low power. For this reason, it is considered to replace a cache memory, a main memory, etc. with a non-volatile memory. An MRAM (Magnetoresistive Random Access Memory) attracts attention because the MRAM satisfies all of three feature requirements of high rewrite durability, high-speed read and write performances, and highly integratable cell areas, among a variety of non-volatile memories. There are high expectations to the MRAM because the MRAM has a higher operation speed than other non-volatile memories when the MRAM is used as a cache, the MRAM has higher area efficiency than conventional memories, and a large-capacity high-speed cache can be built in a processor. Especially, among MRAMs, a perpendicular-magnetization spin transfer mode, referred to as an STT-MRAM (Spin Transfer Torque MRAM), is expected for a variety of applications because of an extremely-small read current, an extremely-short write delay, and a high-speed operation.

A DRAM (Dynamic RAMs) conventionally used as the main memory has a large number of memory cells connected on one word line, so that it takes time to drive the word line. Once the word line is driven, access can be made at a high speed to the large number of memory cells connected on the same word line. Therefore, the DRAM is accessible at a high speed to successive address areas. However, when access is made to non-successive address areas, the access speed is drastically lowered because it takes time to drive a word line associated to the non-successive address areas.

On the other hand, in the case of the MRAM, although there is no particular difference in the access speed to both of the successive and non-successive address areas, the access speed to the successive address areas may be lower than that in the case of the DRAM.

As explained above, the DRAM is suited for writing to the successive address areas, whereas the MRAM is suited for writing to the non-successive address areas.

BRIEF DESCRIPTION OF THE DRAWINGS

FIG. 8 is a diagram that shows a data structure of an access information register according to a second embodiment;

DETAILED DESCRIPTION

According to one embodiment, a memory control circuitry has a write destination selector to select either a volatile memory or a non-volatile memory in a first storage as a write destination, for an address area in the first storage written by a processor, a write controller to write data in the write destination selected by the write destination selector, and an access information register to register information selecting the volatile memory or the non-volatile memory as the write destination, and number-of-times information indicating how many times a page of successive addresses for the address area is switched, as both information being associated with each other. When there is a write request from the processor, the write destination selector selects the write destination based on the information registered in the access information register.

Embodiments will now be explained with reference to the accompanying drawings.

Figure 1:
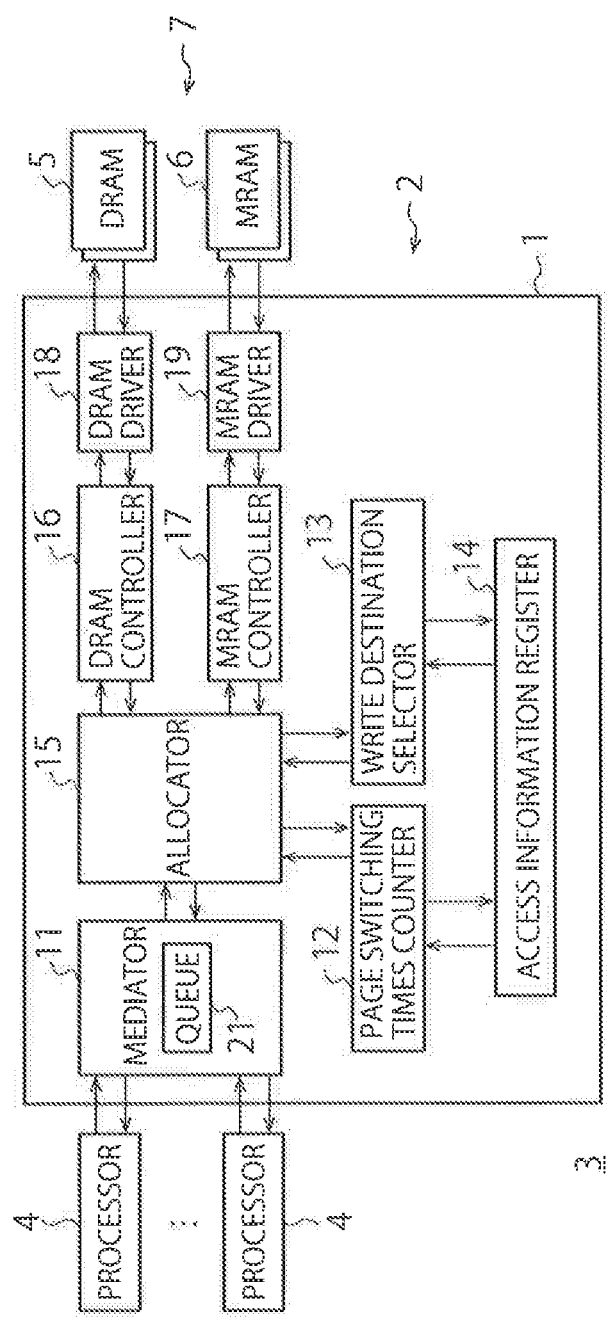
FIG. 1 is a block diagram schematically showing the configuration of a processor system according to an embodiment.

FIG. 1 is a block diagram schematically showing the configuration of a processor system 3 provided with memory control circuitry 1 and a memory system 2 according to an embodiment. The processor system 3 of FIG. 1 is provided with a plurality of processors 4 and the memory system 2 having the memory control circuitry 1 built therein. The processor system 3 may be provided with a single processor 4.

The memory system 2 has the memory control circuitry 1, a DRAM 5, and an MRAM 6. The DRAM 5 and the MRAM 6 each can be used as part of a main memory 7. The memory capacity ratio between the DRAM 5 and the MRAM 6 is arbitrary. The DRAM 5 and the MRAM 6 may be of any type and any standards. The DRAM 5 is a typical example of volatile memories. A volatile memory other than the DRAM 5 may be used. Likewise, the MRAM 6 is a typical example of non-volatile memories. A non-volatile memory other than the MRAM 6 may be used.

The memory control circuitry 1 is provided with a mediator 11, a page switching times counter 12, a write destination selector 13, an access information register 14, an allocator 15, a DRAM controller 16, an MRAM controller 17, a DRAM driver 18, and an MRAM driver 19. The allocator 15, the DRAM controller 16, the MRAM controller 17, the DRAM driver 18, and the MRAM driver 19 are included in a write controller.

The mediator 11 mediates access requests from a plurality of processors 4 to decide a priority order. The mediator 11 has a queue 21 that temporally stores the access requests from the processors 4. The queue 21 temporally stores access request information that includes access commands, addresses, and data which are issued by the processors 4. The queue 21 is configured with a register, for example.

The page switching times counter 12 counts the number of times of page switching that occurs when executing a write request from each processor 4, or the number of times of page opening or closing per page. Here, the page is a memory area of a group of successive addresses to be specified for memory access by each processor 4. The memory area has, for example, several kilobytes. The memory access is performed per page. Access to the memory access of a page requires driving the associated word line. Driving a word line associated with a page is referred to as page opening. Halting driving of a word line associated with a page is referred to as page closing. In the present specification, the number of times of page opening or closing is referred to as the number of page switching times.

The write destination selector 13 selects either the DRAM 5 or the MRAM 6 in the main memory 7 for each of address areas for each of which each processor 4 writes data in the main memory 7. Here, the address area is an address range of the main memory 7, which is accessed by executing each of threads for each of which each processor 4 performs processing. An address area to be accessed by one thread is decided in advance. Different threads access different address areas, in general. The address area to be accessed by one thread may include a plurality of page addresses. In this case, whenever changing the page to be accessed, the page opening and closing processes are required. The write destination selector 13 selects either the DRAM 5 or the MRAM 6 in which data is to be written, for each thread.

The access information register 14 registers selection information on the volatile memory or the non-volatile memory, either memory being a destination for writing, and number-of-times information on page switching, as both information being associated with each other, per address area for which each processor 4 has made a write request. When there is a new write request from the processor 4, the write destination selector 13 selects a destination for writing based on the information registered in the access information register 14 and updates the registered information of the access information register 14. In more detail, when the processor 4 issues a write request to a destination for writing that is unregistered in the access information register 14 or when the number-of-times information in the access information register 14 is updated, the write destination selector 13 updates the selection information in the access information register 14.

In accordance with the destination for writing selected by the write destination selector 13, the allocator 15 notices a write request of each processor 4 to either the DRAM controller 16 or the MRAM controller 17. According to the write request of the processor 4, the DRAM controller 16 performs write control to the DRAM 5. In accordance with the standards of the DRAM 5, the DRAM driver 18 controls the timing for sending an address, data, and a control signal to the DRAM 5. According to the write request of the processor 4, the MRAM controller 17 performs write control to the MRAM 6. In accordance with the standards of the MRAM 6, the MRAM driver 19 controls the timing for sending an address, data, and a control signal to the MRAM 6.

Figure 2A:
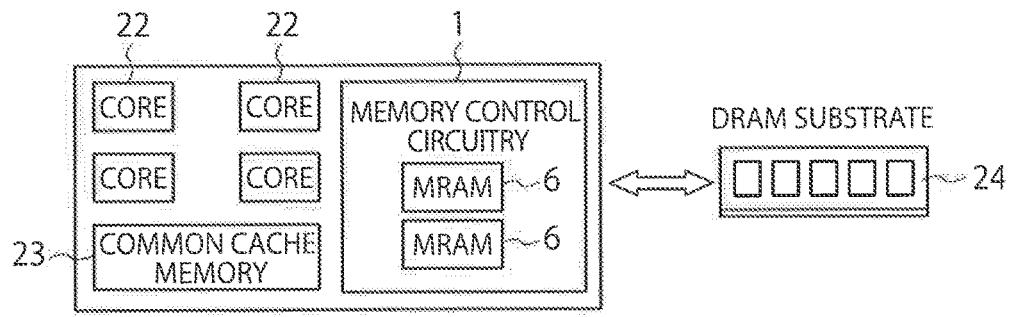
FIG. 2A is a block diagram showing an example in which a plurality of processor cores, a common cache memory, memory control circuitry, and MRAMs are integrated into a chip.
Figure 2B:
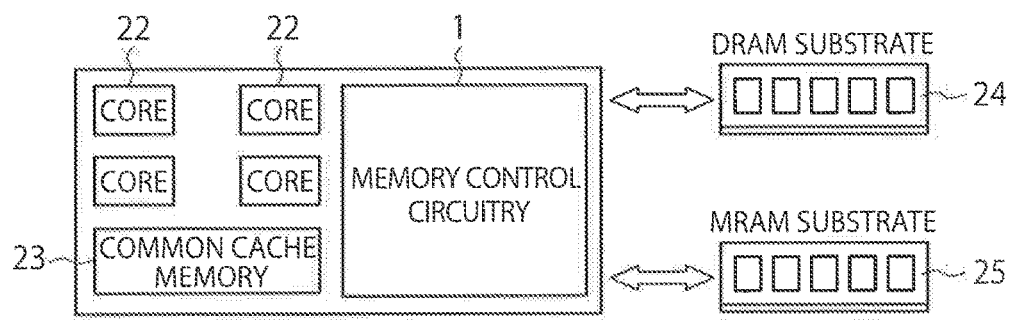
FIG. 2B is a block diagram showing an example in which a plurality of processor cores and memory control circuitry are integrated into a chip, and DRAMs and MRAMs are mounted on different memory substrates, respectively.
Figure 2C:
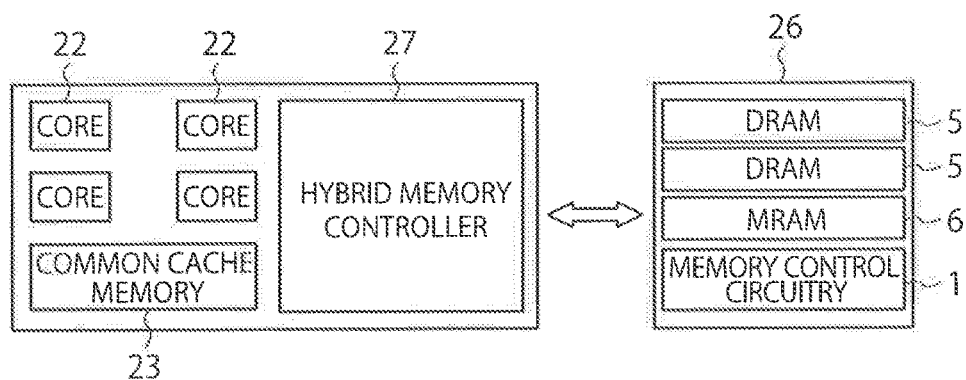
FIG. 2C is a block diagram showing an example in which a chip into which or a substrate on which DRAMs, an MRAM, and memory control circuitry are integrated or mounted is provided apart from a chip of processor cores.

In FIG. 1, the memory control circuitry 1 may be integrated into a chip, together with the processors 4, or the memory control circuitry 1 and the processors 4 may be integrated into different chips. Moreover, in FIG. 1, the memory control circuitry 1 may be integrated into a chip, together with at least one of the DRAM 5 and the MRAM 6. There are three typical configuration modes for the memory control circuitry 1 of FIG. 1, as shown in FIGS. 2A, 2B, and 2C. It is a matter of course that there are configuration modes other than those of FIGS. 2A, 2B, and 2C.

FIG. 2A shows an example of the configuration mode in which a plurality of processor cores 22, a common cache memory 23, memory control circuitry 1, and MRAMs 6 are integrated into a chip. By way of one-chip integration, a transfer delay of signals transmitted and received among the processor cores 22, the memory control circuitry 1, and the MRAMs 6 can be shortened, and also a noise effect can be reduced. In FIG. 2A, DRAMs 5 are mounted on the DRAM substrate 24. Each processor 4 of FIG. 1 includes the processor cores 22 and the common cache 23 of FIG. 2A. The processors 4 may share one common cache 23. The processor cores 22 in one processor 4 may share one common cache 23.

FIG. 2B shows an example of the configuration mode in which a plurality of processor cores 22 and memory control circuitry 1 are integrated into a chip, and DRAMs 5 and MRAMs 6 are mounted on different memory substrates 24 and 25, respectively. In the case of FIG. 2B, the memory capacity of the DRAMs 5 and MRAMs 6 can be separately increased or decreased, so that high versatility is achieved.

FIG. 2C shows an example of providing a chip or a substrate 26 on which DRAMs, an MRAM 6, and memory control circuitry 1 are integrated or mounted, separately from a chip of processor cores 22. The MRAM 6 may be integrated with the memory control circuitry 1. In the chip of processor cores 22, a hybrid memory controller 27 is provided to send and receive data, addresses, and control signals at a high speed to and from the chip or the substrate on which the memory control circuitry 1 and like is integrated or mounted.

Figures 3, 4:
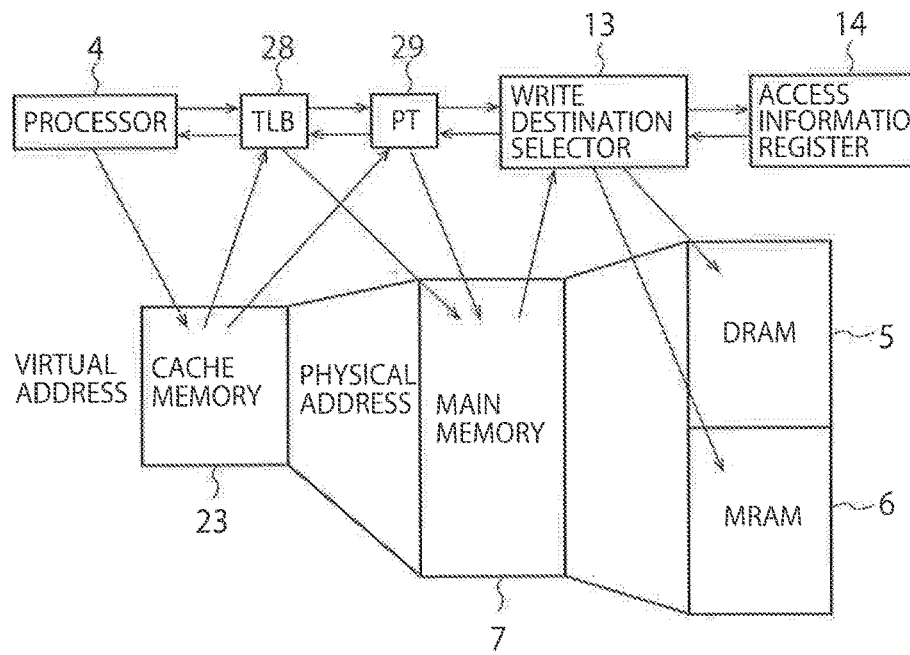
FIG. 3 is a diagram that explains addresses of processors 4, a main memory, a DRAM, and an MRAM.
FIG. 4 is a diagram that shows a data structure of an access information register.

FIG. 3 is a diagram that explains addresses of the processors 4, the main memory 7, the DRAM 5, and the MRAM 6. Each processor 4 issues a virtual address. The virtual address issued by the processor 4 is converted into a physical address by a TLB (Translation Lookaside Buffer) 28 or a page table (PT) 29. The physical address is used for accessing the main memory 7. The write destination selector 13 converts the physical address into an address for accessing the DRAM 5 or the MRAM 6. The address converted by the write destination selector 13 is registered in the access information register 14.

As understood from FIG. 3, the address space for accessing the DRAM 5 is provided apart from the address space for accessing the MRAM 6. The address space for accessing the main memory 7 is allocated to the DRAM 5 or the MRAM 6 per address area. The allocation is dynamically changed.

In other words, the write destination selector 13 dynamically allocates each address area to the DRAM 5 or the MRAM 6 in accordance with the free space of the DRAM 5 and the MRAM 6, the number of page switching times for each address area, etc.

FIG. 4 is a diagram that shows the data structure of the access information register 14. The access information register 14 of FIG. 4 registers, per thread, a physical address of each thread, a thread ID, the number of page switching times, and an address of the selected DRAM 5 or MRAM 6 (referred to as a hybrid address in the present specification), as associated with one another. Since the number of page switching times is updated at a constant interval, pieces of information on the number of page switching times from the present to the past are registered in the access information register 14.

When there is a write request from each processor 4, the write destination selector 13 looks up the access information register 14 to select either the DRAM 5 or the MRAM 6 and decide a write address. If there is no big change in the number of page switching times registered in the access information register 14, the write destination selector 13 selects either the DRAM 5 or the MRAM 6 in accordance with the selection information, on the DRAM 5 or the MRAM 6, registered in the access information register 14. On the other hand, if there is a big change in the number of page switching times registered in the access information register 14, or in the case of an address area not registered in the access information register 14, the write destination selector 13 changes the selection of the DRAM 5 and the MRAM 6 based on the number of page switching times. In this case, the write destination selector 13 updates the registered information of the access information register 14.

Figure 5:
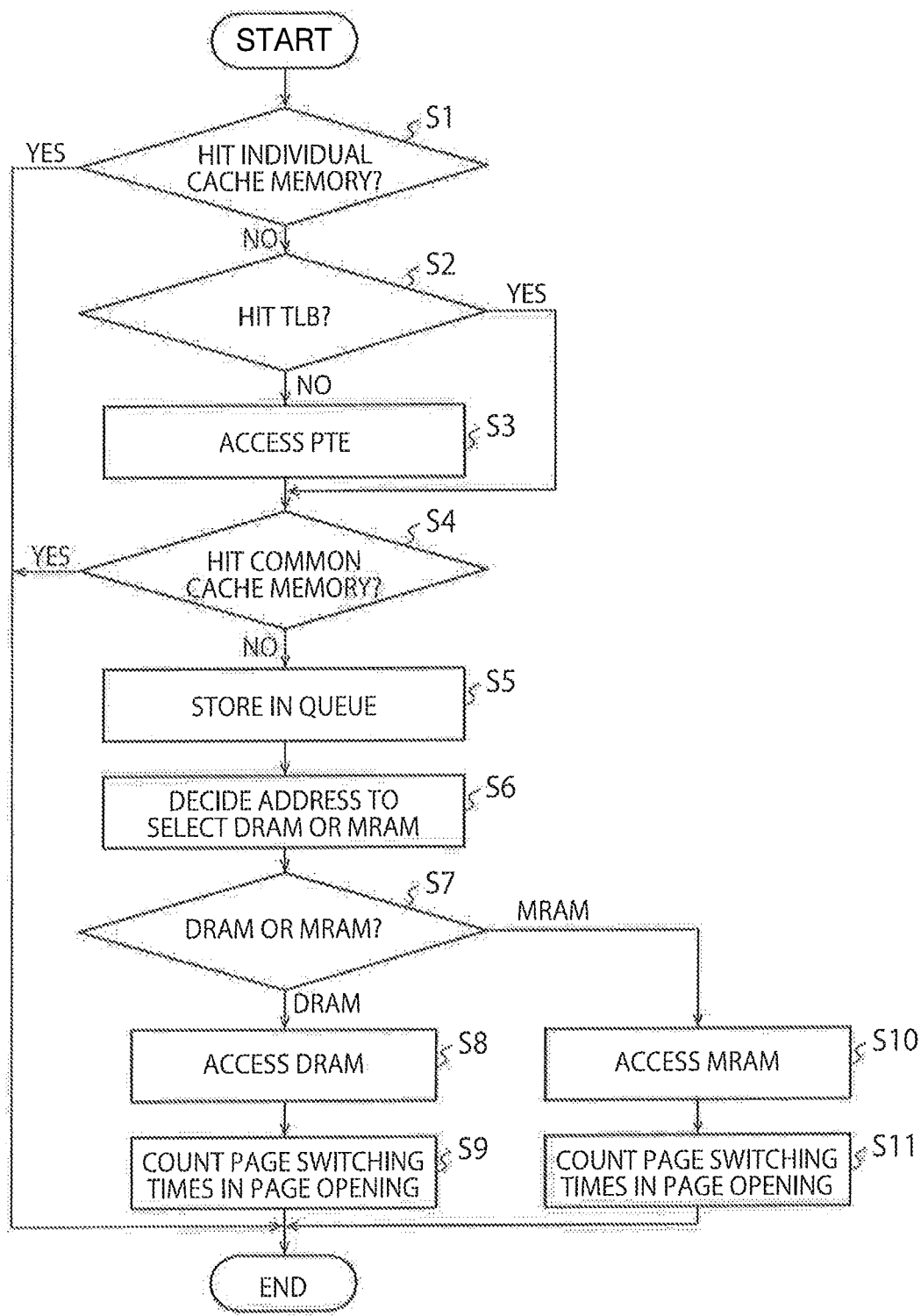
FIG. 5 is a flowchart showing an example of the operation of a processor system in the case where each processor makes an access request.

FIG. 5 is a flowchart showing an example of the operation of the processor system 3 in the case where each processor 4 makes an access request (for example, a write request). The flowchart shows an example of the operation of the processor system 3 in the case where the processor system 3 is provided with individual cache memories each provided per processor 4, a common cache memory 23 shared by a plurality of processors 4, a TLB 28, and a page table 29. The individual cache memories are memories of the highest access priority. The common cache memory 23 is a memory of a lower access priority than the individual cache memories but of a higher access priority than the main memory 7. The common cache memory 23 is also referred to as a last-level cache memory. The common cache memory 23 has a larger memory capacity than the individual cache memories. The TLB 28 and the page table 29 each have a conversion table for converting a virtual address issued by each processor 4 into a physical address. The conversion table of the TLB 28 is smaller than the conversion table of the page table 29 but can perform conversion into the physical address at a higher speed than the conversion table of the page table 29. The page table 29 registers address conversion information on all data stored in the main memory 7, part of the address conversion information being registered in the TLB 28.

The process in the flowchart of FIG. 5 starts when each processor 4 makes an access request. At first, it is determined whether an access-requested address hits the individual cache memory (step S1). If there is a hit, the process of FIG. 5 ends because access is made to the individual cache memory.

If there is a miss to the individual cache memory in step S1, access is made to the TLB 28 to determine whether to hit (step S2). If there is a miss in the TLB 28, access is made to entry information (hereinafter, page table entry or PTE).

If there is a hit in the TLB 28 in step S2 or if access is made to the page table 29 in step S3, access is made to the common cache memory 23 using address conversion information with which there is a hit in the TLB 28 or address conversion information acquired by accessing the page table 29, to determine whether there is a hit to the common cache memory 23 (step S4). If there is a hit to the common cache memory 23, the process of FIG. 5 ends because access is made to the common cache memory 23.

If there is a miss to the common cache memory 23 in step S4, the access request from the processor 4 is stored in the queue 21 in the mediator 11 (step S5). Subsequently, based on the information registered in the access information register 14, the write destination selector 13 selects either the DRAM 5 or the MRAM 6 to decide an address to be accessed (step S6). Subsequently, based on the address decided by the write destination selector 13, the allocator 15 determines whether to access the DRAM 5 or the MRAM 6 (step S7). If it is determined to access the DRAM 5, access is made to the DRAM 5 via the DRAM controller 16 and the DRAM driver 18 (step S8). If a new page is opened when access is made to the DRAM 5, the number of page switching times is counted up (step S9). If it is determined to access the MRAM 6 in step S7, access is made to the MRAM 6 via the MRAM controller 17 and the MRAM driver 19 (step S10). If a new page is opened when access is made to the MRAM 6, the number of page switching times is counted up (step S11).

Figure 6:
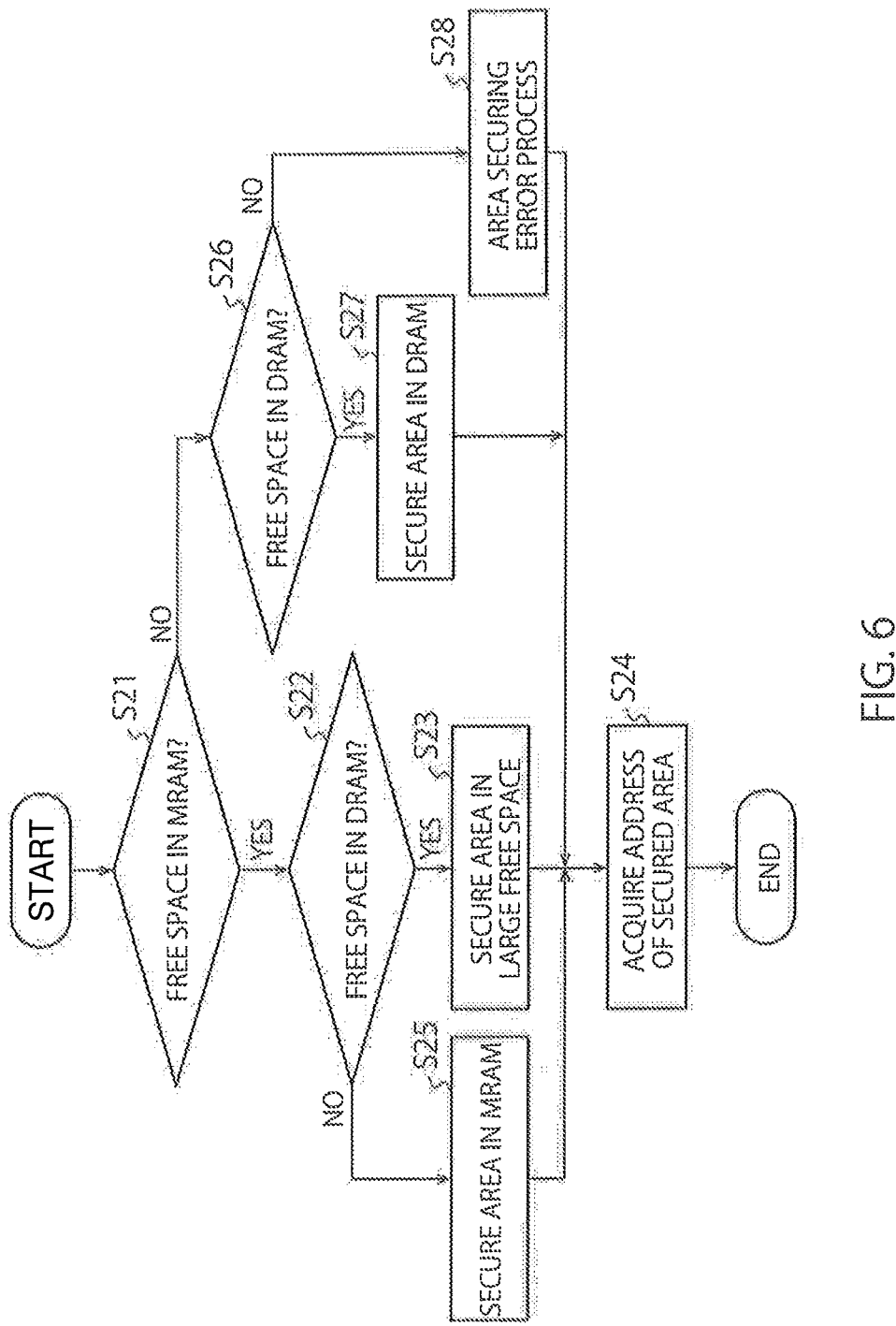
FIG. 6 is a flowchart showing an updating process in an access information register to be performed by a write destination selector.
Figure 7:
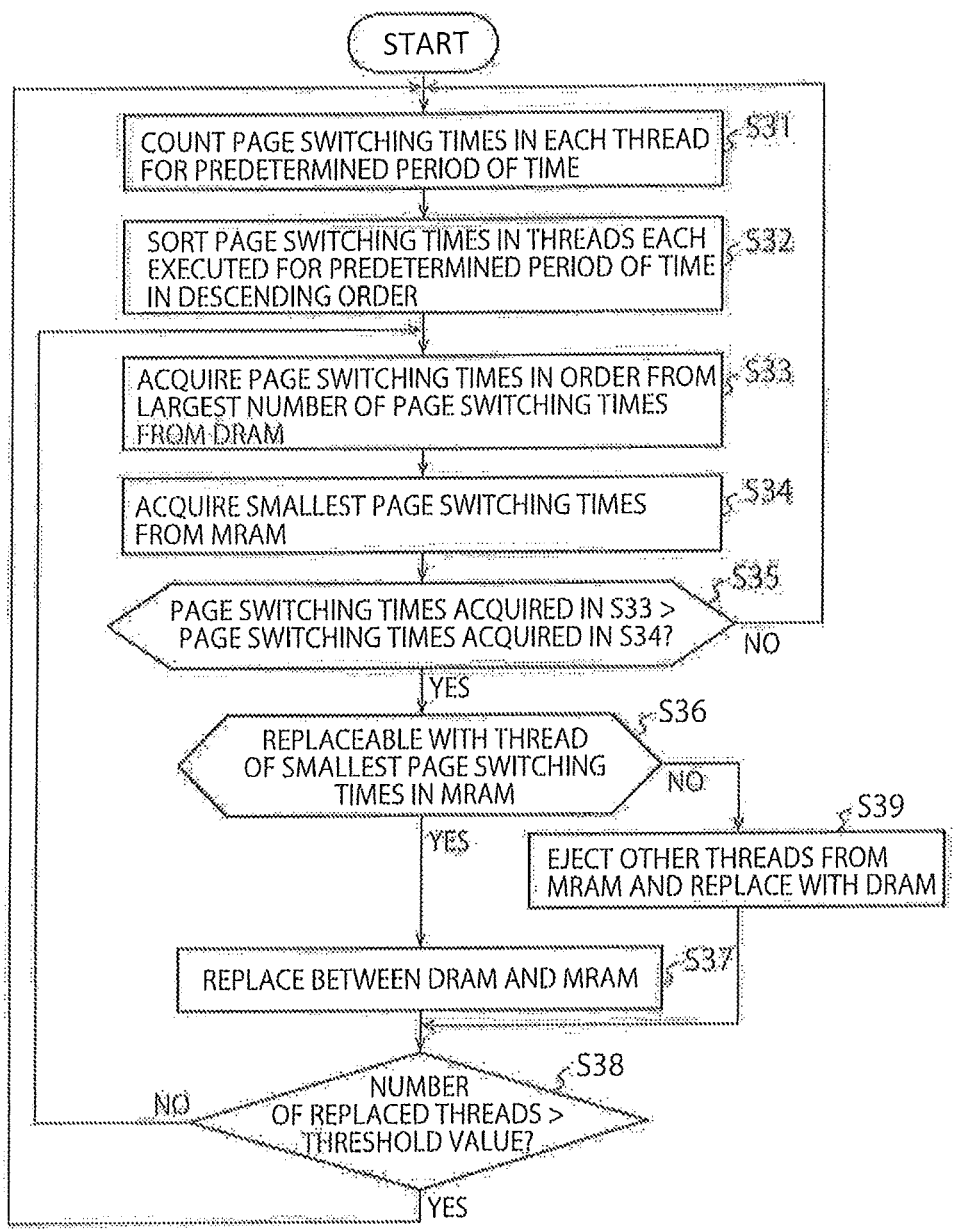
FIG. 7 is a flowchart following to that of FIG. 6.

FIGS. 6 and 7 are flowcharts showing an updating process that is performed by the write destination selector 13 to the access information register 14. The flowcharts show an example of the updating process that is performed in real time by the write destination selector 13 to the access information register 14.

The updating process of FIGS. 6 and 7 is performed in two stages. When there is an access request (in this case, a write request) from each processor 4, firstly, as shown in FIG. 6, a process is performed to write access-requested data in either the MRAM 6 or the DRAM 5, which has a larger free space. Subsequently, as shown in FIG. 7, a process is performed to replace data in the MRAM 6, of a smaller number of page switching times, with data of a larger number of page switching times, among data in the DRAM 5. Hereinbelow, the processes of FIGS. 6 and 7 will be explained in order.

The process in the flowchart of FIG. 6 starts when each processor 4 makes a new access request. At first, it is determined whether the MRAM 6 has a free space (step S21, a first free-space determiner). If it is determined that the MRAM 6 has a free space, it is determined whether the DRAM 5 has a free space (step S22, a second free-space determiner). If it is determined that the DRAM 5 has a free space, either the DRAM 5 or the MRAM 6, which has a larger free space, is selected to secure an area for data writing (step S23). Subsequently, an address of the secured address is acquired (step S24). The acquired address is sent to the allocator 15. The allocator 15 identifies the DRAM 5 or the MRAM 6 with the address to write data in the identified one.

If it is determined in step S22 that the DRAM 5 has no free space, an area for data writing is secured in the MRAM 6 (step S25), and thereafter, the above-described step S24 is performed.

If it is determined in step S21 that the MRAM 6 has no free space, it is determined whether the DRAM 5 has a free space (step S26). If it is determined that the DRAM 5 has a free space, an area for data writing is secured in the DRAM 5 (step S27), and thereafter, the above-described step S24 is performed. If it is determined in step S26 that the DRAM 5 has no free space. It is indicated that the DRAM 5 and the MRAM 6 both have no free space, an error indicating impossibility of area securing is returned (step S28), and the process ends.

The process of FIG. 7 starts after data has been written in either of the DRAM 5 and the MRAM 6 in the process of FIG. 6. Firstly, the number of page switching times in each thread executed by each processor 4 is counted for a predetermined period of time (step S31). Subsequently, the numbers of page switching times in respective threads each executed by the processor 4 for the predetermined period of time are sorted in descending order (step S32, a sorter). Subsequently, for data in respective threads, which have been stored in the DRAM 5 for the predetermined period of time, the numbers of page switching times are acquired in order from the largest number of page switching times (step S33). Subsequently, the smallest number of page switching times for particular data is acquired among data stored in the MRAM 6 in respective threads (step S34).

It is determined whether each number of page switching times acquired in step S33 is larger than the smallest number of page switching times acquired in step S34 (step S35). If NO in this determination, step S31 and the following steps are repeated. If YES in the determination of step S35, it is determined whether data acquired in steps S33 and S34 can be replaced with each other between the DRAM 5 and the MRAM 6 (step S36). If it is determined that the replacement is possible, data in these threads are replaced with each other between the DRAM 5 and the MRAM 6 (step S37).

Subsequently, it is determined whether the number of threads for which the replacements have been performed reaches a threshold value (step S38). If not reaching yet, step S33 and the following steps are repeated. If it is determined in step S38 that the number of threads reaches the threshold value, step S31 and the following steps are repeated.

If it is determined in step S36 that the replacement is impossible, it is considered that the MRAM 6 has no free space. In this case, a thread in the MRAM 6, with the smallest number of page switching times, may only be ejected from the MRAM 6 or may be ejected from the MRAM 6, together with other threads. In this way, the replacement with threads in the DRAM 5 is executed (step S39), and thereafter, step S38 and the following steps are performed.

As described above, in the first embodiment, when each processor 4 makes a write request to the main memory 7 in executing each thread, either of the DRAM 5 and the MRAM 6 is selected and data is written in the selected one, based on the number of page switching times per thread. In more specifically, for a thread with a larger number of page switching times, data is written in the MRAM 6, whereas for a thread with a smaller number of page switching times, data is written in the DRAM 5. In this way, in writing data in successive address areas, the data are written in the DRAM 5, and hence it is possible to write data at a high speed by taking advantage of the features of the DRAM 5. Moreover, in writing data in non-successive address areas, data are written in the MRAM 6 and hence the data write speed is not reduced even if page opening and closing are often occurred.

Moreover, in the first embodiment, when there is a write request from each processor 4, firstly, data is written in either of the DRAM 5 and the MRAM 6, having a larger free space. Thereafter, the number of page switching times for data in each of threads stored in the DRAM 5 and the MRAM 6 is counted for a predetermined period of time. Then, data replacement is performed in such a manner that data of a larger and a smaller count in the threads are put into the MRAM 6 and the DRAM 5, respectively. In this way, a data write real-time process is made possible to achieve high-speed data writing to the main memory 7.

Second Embodiment

In the first embodiment, the number of page switching times is registered in the access information register 14 for each thread executed by each processor 4. Then, based on the registered number of page switching times, either of the DRAM 5 and the MRAM 6 is selected and data is written in the selected one. On the other hand, in the second embodiment, for each page table entry newly added by each processor 4, the number of page switching times is registered in the access information register 14. Then, based on the registered number of page switching times, either of the DRAM 5 and the MRAM 6 is selected and data is written in the selected one.

The page table entry is entry information for accessing the page table 29. The page table 29 registers address conversion information for all addresses stored in the main memory 7. The address conversion information is information that indicates the correspondence relationship between virtual addresses issued by each processor 4 and physical addresses for accessing the main memory 7. When the processor 4 accesses the main memory 7, the page table 29 is searched and, if the address to be accessed is not registered in the page table 29, a new page table entry is created. The page table entry is provided for each predetermined address area. The address area in this case is part of a storage area in the main memory 7, the part of the storage area being to be accessed with address conversion information for converting a virtual address group for page accessing to a physical address group. The address area is a successive address range having several kilobytes, for example. The write destination selector 13 selects either of the DRAM 5 and the MRAM 6 for data writing per page table entry.

The block configuration of the processor system 3 according to the second embodiment is the same as that of FIG. 1. FIG. 8 is a diagram that shows the data structure of an access information register 14 according to the second embodiment. The access information register 14 of FIG. 8 registers, per page table entry, a physical address of each page table entry, a page table entry ID (PTE ID), the number of page switching times, and an address of the selected DRAM 5 or MRAM 6, as associated with one another.

In the same manner as the first embodiment, when each processor 4 makes a write request, the write destination selector 13 selects either of the DRAM 5 and the MRAM 6 and writes data in the selected one, based on the registered information of the access information register 14. Moreover, when there is a change in the number of page switching times of each page table entry, based on the changed number of page switching times, the write destination selector 13 updates a result of selection between the DRAM 5 and the MRAM 6, and registers the updated information in the access information register 14.

In the second embodiment, in the same manner as the first embodiment, when each processor 4 makes a write request, either of the DRAM 5 and the MRAM 6 is selected and data is written in the selected one, and the stored data of the DRAM 5 and the MRAM 6 are replaced with each other in accordance with the number of page switching times of each page table entry, in real-time processing.

Figure 9:
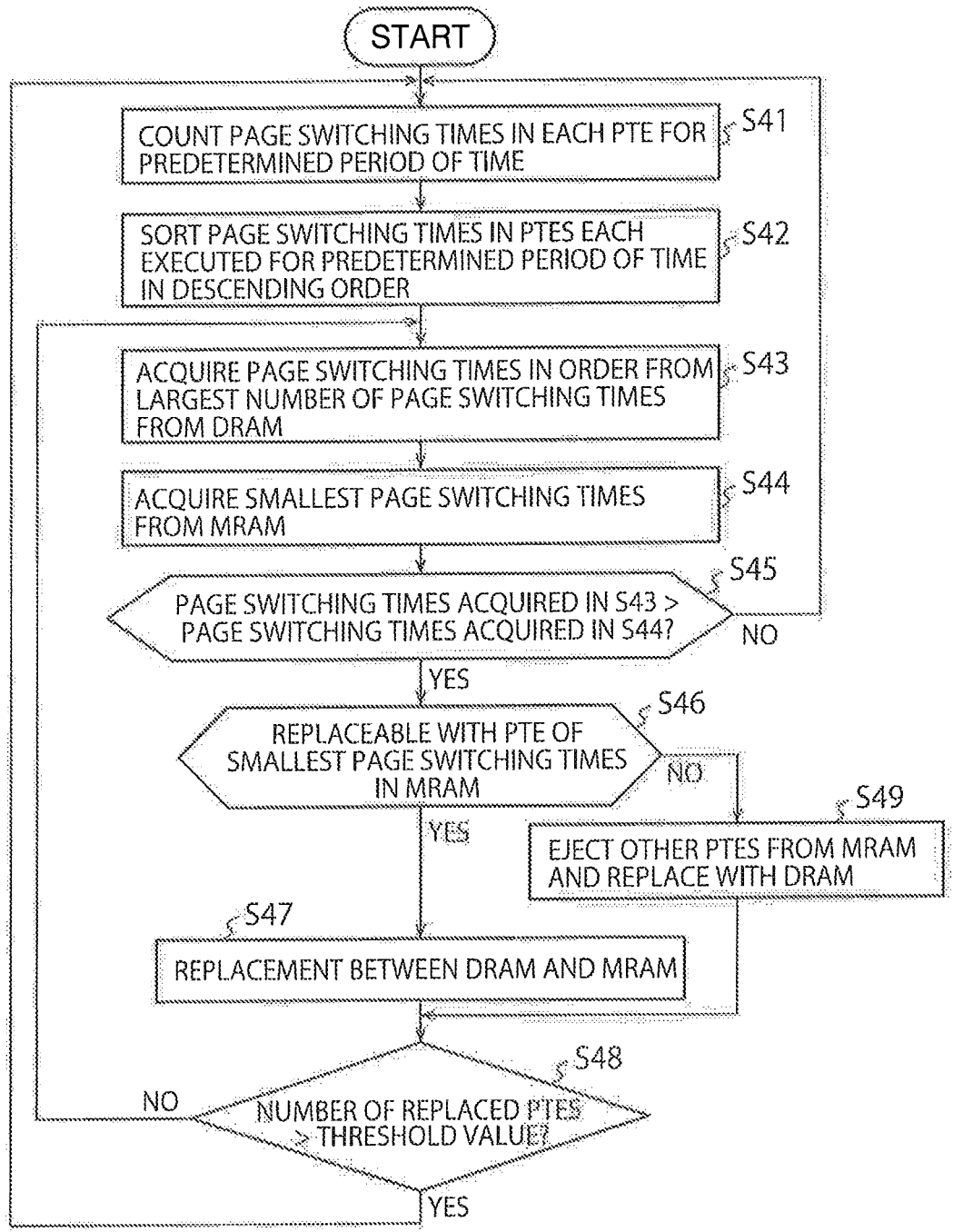
FIG. 9 is a flowchart showing an example of a data write process according to the second embodiment.

In the second embodiment, in the same manner as the first embodiment, firstly by the same process as that of FIG. 6, data, for which there is a write request from each processor 4, is stored in either of the DRAM 5 and the MRAM 6, which has a larger free space. Thereafter, in the second embodiment, a process of FIG. 9 is performed. FIG. 9 is a flowchart showing an example of a data write process according the second embodiment.

Firstly, the number of page switching times in each page table entry accessed by each processor 4 is counted for a predetermined period of time (step S41). Subsequently, the numbers of page switching times in respective page table entries each accessed by the processor 4 for the predetermined period of time are sorted in descending order (step S42). Subsequently, for data in respective page table entries, which have been stored in the DRAM 5 for the predetermined period of time, the numbers of page switching times are acquired in order from the largest number of page switching times (step S43). Subsequently, the smallest number of page switching times for particular data is acquired among data of respective page table entries stored in the MRAM 6 (step S44).

It is determined whether each number of page switching times acquired in step S43 is larger than the smallest number of page switching times acquired in step S44 (step S45). If NO in this determination, step S41 and the following steps are repeated. If YES in the determination of step S45, it is determined whether data acquired in steps S43 and S44 can be replaced with each other between the DRAM 5 and the MRAM 6 (step S46). If it is determined that the replacement is possible, data in these page table entries are replaced with each other between the DRAM 5 and the MRAM 6 (step S47).

Subsequently, it is determined whether the number of data for which the replacements have been performed reaches a threshold value (step S48). If not reaching yet, step S43 and the following steps are repeated. If it is determined in step S48 that the number of threads reaches the threshold value, step S41 and the following steps are repeated.

If it is determined in step S46 that the replacement is impossible, it is considered that MRAM 6 has no free space. In this case, a page entry in the MRAM 6, with the smallest number of page switching times, may only be ejected from the MRAM 6 or may be ejected from the MRAM 6, together with other page entries. In this way, the replacement with page entries in the DRAM 5 is executed (step S47), and thereafter, step S46 and the following steps are performed.

As described above, in the second embodiment, when each processor 4 makes a write request to add a new page table entry, either of the DRAM 5 and the MRAM 6 is selected and data is written in the selected one, based on the number of page switching times in the added page table entry. In more specifically, for a page table entry with a larger number of page switching times, data is written in the MRAM 6, whereas for a page table entry with a smaller number of page switching times, data is written in the DRAM 5. In this way, in writing data in successive address areas, the data are written in the DRAM 5, and hence it is possible to write data at a high speed by taking advantage of the features of the DRAM 5. Moreover, data are written in the MRAM 6 in writing data in non-successive address areas, and hence the data write speed is not reduced even if page opening and closing are often occurred.

Moreover, also in the second embodiment, data can be written in the same process as that of the first embodiment, and hence a data write real-time process is made possible to achieve high-speed data writing to the main memory 7.

Third Embodiment

In the third embodiment, when each processor 4 executes a thread, not replacing data in the DRAM 5 and the MRAM 6 with each other in real time in accordance with the number of page switching times, but only for data newly written in the main memory 7, either of the DRAM 5 and the MRAM 6 is selected and the newly written data is written in the selected one in accordance with the number of page switching times.

Also in the third embodiment, by the same process as that of FIG. 6 (the process of an initial write controller), data for which there is a write request from each processor 4 is stored in either of the DRAM 5 and the MRAM 6, which has a larger free space. Thereafter, in the third embodiment, a process of FIG. 10 is performed.

Figure 10:
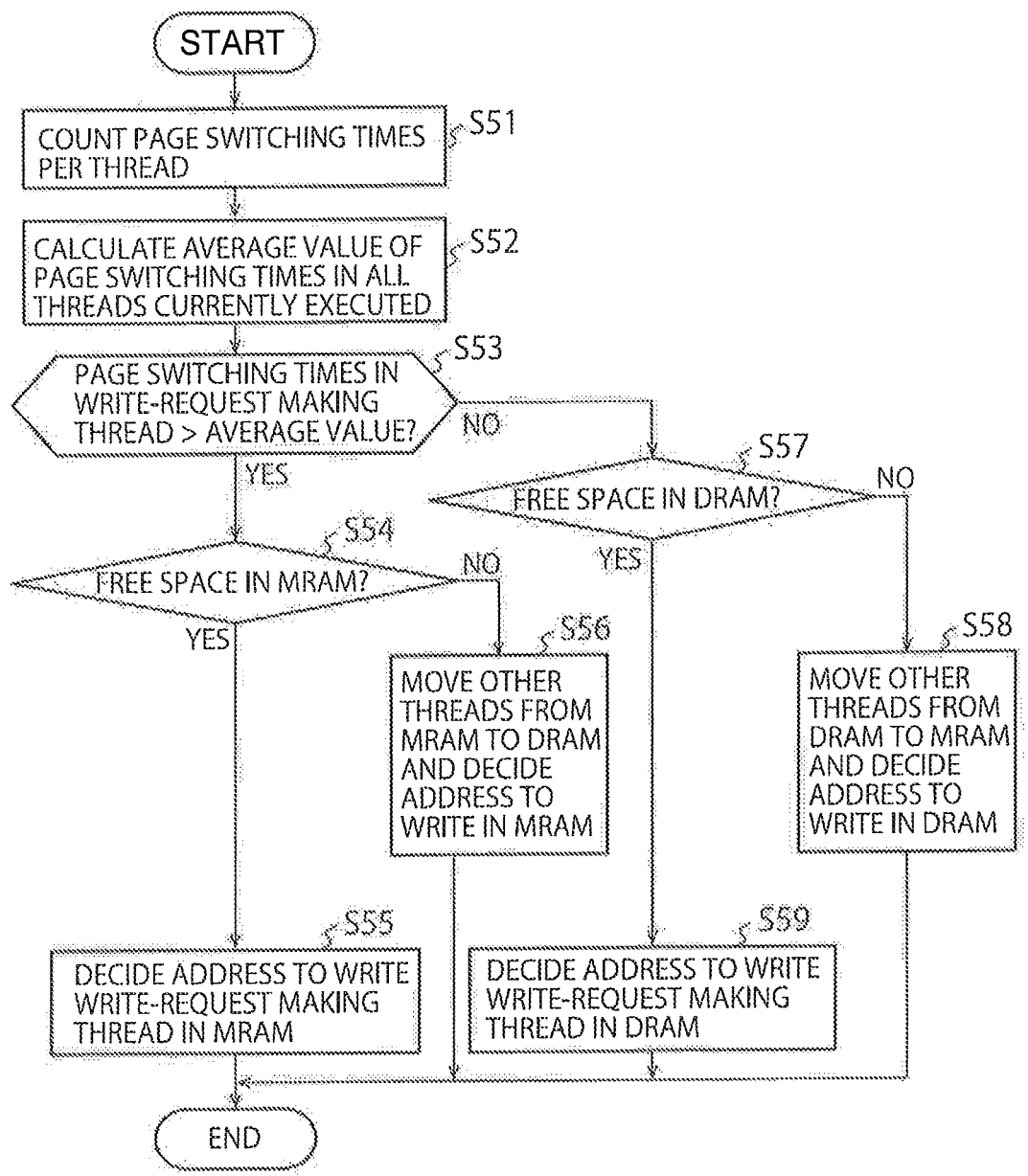
FIG. 10 is a flowchart showing an example of a data write process according to a third embodiment.

FIG. 10 is a flowchart showing an example of a data write process according the second embodiment. Firstly, the number of page switching times is counted for a predetermined period of time per thread executed by each processor 4 (step S51). Subsequently, an average value of the numbers of page switching times in all threads that are currently being executed by the processor 4 is calculated (step S52).

Subsequently, it is determined whether the number of page switching times in a thread that has made a write request is larger than the average value calculated in step S52 (step S53, an average value detector). If it is determined that the number of page switching times in the thread that has made a write request is larger than the average value, it is determined whether the MRAM 6 has a free space (step S54). If it is determined that the MRAM 6 has a free space, an address for writing data of the thread that has made a write request in the MRAM 6 is decided (step S55).

If it is determined in step S54 that the MRAM 6 has no free space, data with a smaller number of page switching times is selected in high priority among data of threads stored in the MRAM 6 and is moved from the MRAM 6 to the DRAM 5 to secure an area in the MRAM 6, to decide an address for writing data of the thread that has made a write request to the secured area (step S56).

If it is determined in step S53 that the number of page switching times in the thread that has made a write request is equal to or smaller than the average value calculated in step S52, it is determined whether the DRAM 5 has a free space (step S57). If it is determined that the DRAM 5 has a free space, an address for writing data of the thread that has made a write request in the DRAM 5 is decided (step S59).

If it is determined in step S57 that the DRAM 5 has no free space, data with a larger number of page switching times is selected in high priority among data of threads stored in the DRAM 5 and is moved from the DRAM 5 to the MRAM 6 to secure an area in the DRAM 5, to decide an address for writing data of the thread that has made a write request to the secured area (step S58).

As described above, in the third embodiment, in writing data in the main memory 7, the numbers of page switching times in all threads under execution are compared with the average value, and for threads with the number of page switching times equal to or smaller than the average value, data are written in the DRAM 5, whereas for threads with the number of page switching times larger than the average value, data are written in the MRAM 6. In this way, although data in the MRAM 6 and the DRAM 5 cannot be updated in real time, when newly writing data, either the DRAM 5 or the MRAM 6 is selected based on the number of page switching times and the data is written in the selected one. Therefore, it is possible to achieve high-speed data writing to the main memory 7 with a smaller processing amount than the first and second embodiments.

Fourth Embodiment

In the fourth embodiment, when each processor 4 adds a new page table entry, not replacing data in the DRAM 5 and the MRAM 6 with each other in real time in accordance with the number of page switching time, but, only for data to be newly written in the main memory 7, either of the DRAM 5 and the MRAM 6 is selected and the data is written in the selected one in accordance with the number of page switching times.

Also in the fourth embodiment, by the same process as that of FIG. 6, data for which there is a write request from each processor 4 is stored in either of the DRAM 5 and the MRAM 6, which has a larger free space. Thereafter, in the fourth embodiment, a process of FIG. 11 is performed.

Figure 11:
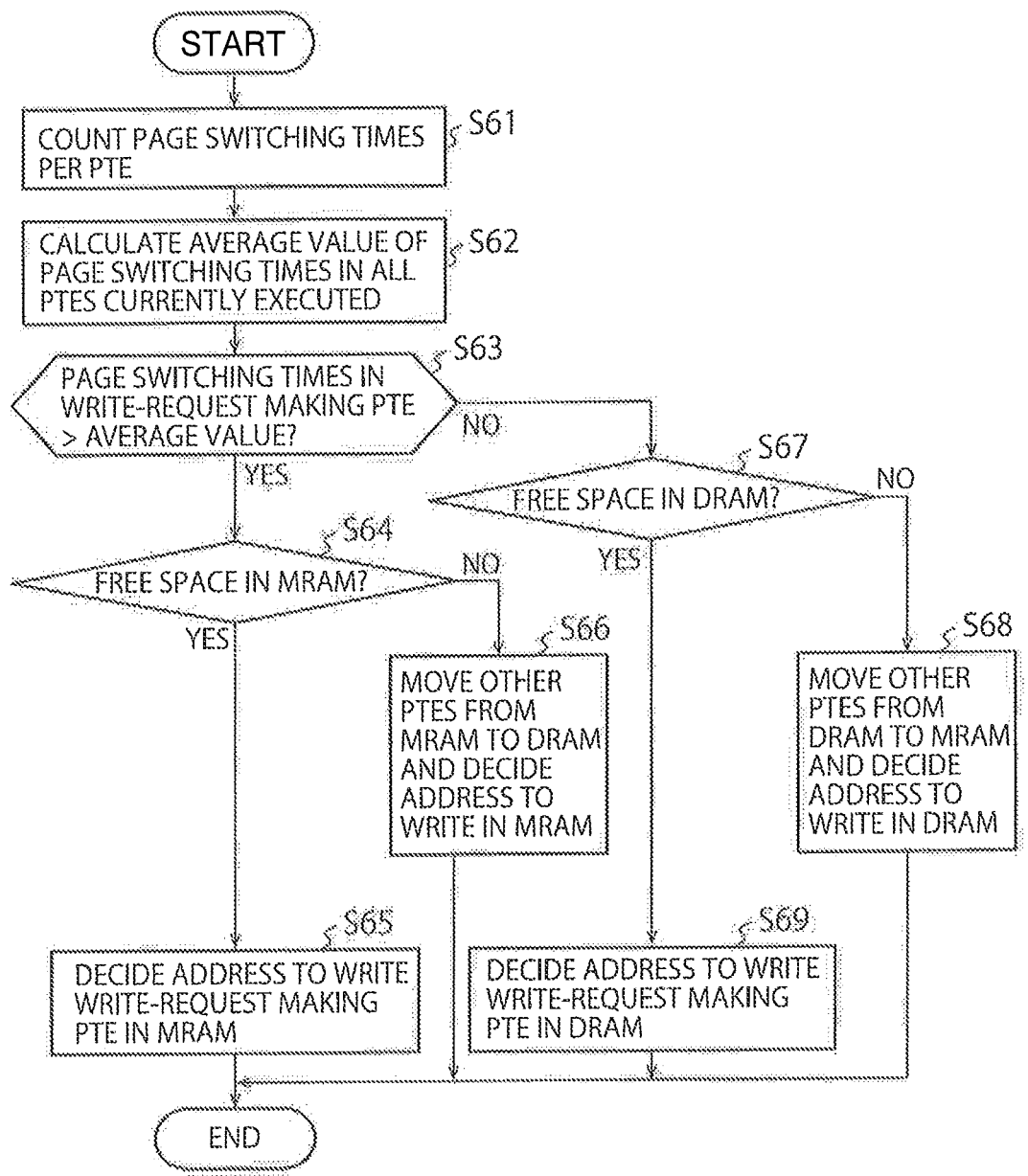
FIG. 11 is a flowchart showing a data write process according to a fourth embodiment.

FIG. 11 is a flowchart showing an example of a data write process according the fourth embodiment. Firstly, the number of page switching times is counted for a predetermined period of time per page table entry accessed by each processor 4 (step S61). Subsequently, an average value of the numbers of page switching times in all page table entries that are currently being executed by the processor 4 is calculated (step S62).

Subsequently, it is determined whether the number of page switching times in a page entry that has made a write request is larger than the average value calculated in step S52 (step S63). If it is determined that the number of page switching times in the page table entry that has made a write request is larger than the average value, it is determined whether the MRAM 6 has a free space (step S64). If it is determined that the MRAM 6 has a free space, an address for writing data of the page table entry that has made a write request in the MRAM 6 is decided (step S65).

If it is determined in step S64 that the MRAM 6 has no free space, data with a smaller number of page switching times is selected in high priority among data of page table entries stored in the MRAM 6 and is moved from the MRAM 6 to the DRAM 5 to secure an area in the MRAM 6, to decide an address for writing data of the page table entry that has made a write request to the secured area (step S66).

If it is determined in step S63 that the number of page switching times in the page table entry that has made a write request is equal to or smaller than the average value calculated in step S62, it is determined whether the DRAM 5 has a free space (step S67). If it is determined that the DRAM 5 has a free space, an address for writing data of the page table entry that has made a write request in the DRAM 5 is decided (step S69).

If it is determined in step S67 that the DRAM 5 has no free space, data with a larger number of page switching times is selected in high priority among data of page table entries stored in the DRAM 5 and is moved from the DRAM 5 to the MRAM 6 to secure an area in the DRAM 5, to decide an address for writing data of the page table entry that has made a write request to the secured area (step S68).

As described above, in the fourth embodiment, in writing data in the main memory 7, the numbers of page switching times in all page table entries under execution are compared with the average value, and data for page table entries with the number of page switching times equal to or smaller than the average value are written in the DRAM 5, whereas data for page table entries with the number of page switching times larger than the average value are written in the MRAM 6. In this way, although data in the MRAM 6 and the DRAM 5 cannot be updated in real time, when newly writing data, either the DRAM 5 or the MRAM 6 is selected based on the number of page switching times. Therefore, it is possible to achieve high-speed data writing to the main memory 7 with a smaller processing amount than the first and second embodiments.

Fifth Embodiment

At least part of the processes of the first to fourth embodiments described above can be performed by software. For example, an operating system (hereinafter, OS) may perform the processes of the write destination selector 13, the access information register 14, and the allocator 15 in the first to fourth embodiments. In this way, even for memory control circuitry 1 with no functions of the write destination selector 13, the access information register 14, and the allocator 15, by means of the OS function, the memory control circuitry 1 having substantially the same block configuration as that of FIG. 1 can be realized. Therefore, while using existing memory control circuitry 1 as hardware, by means of the OS function, the DRAM 5 and the MRAM 6 are selectively used to achieve high-speed data writing to the main memory 7.

Moreover, when data to be written to the main memory 7 are allocated to the DRAM 5 and the MRAM 6 by means of software, high flexibility is achieved more than in the case of an allocation process by means of hardware. For example, in the first to fourth embodiments, the allocation process is performed in accordance with an execution state of each processor 4 during the predetermined period of time. However, in the case of the allocation process by means of software, the allocation process can be performed in advance by analyzing a program to be executed by each processor 4 before execution.

Figure 12:
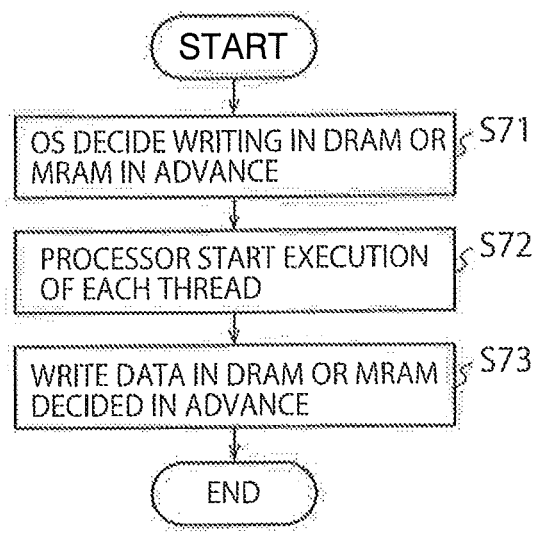
FIG. 12 is a flowchart showing a first example of an allocation process to be performed by an OS.
Figure 13:
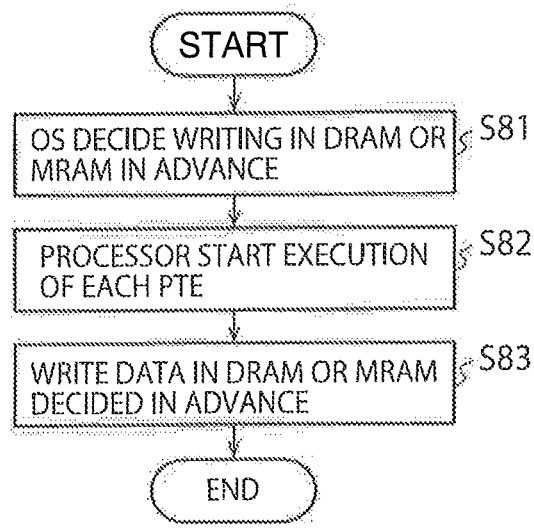
FIG. 13 is a flowchart showing a second example of the allocation process to be performed by the OS.

FIG. 12 is a flowchart showing a first example of the allocation process to be performed by the OS. FIG. 13 is a flowchart showing a second example of the allocation process to be performed by the OS. In both of the processes in FIGS. 12 and 13, not allocating data to the DRAM 5 and the MRAM 6 in real time when there is a write request from each processor 4, but only data for which there is a write request is written in either of the DRAM 5 and the MRAM 6.

In the first example of FIG. 12, the OS analyzes a program of each thread to be executed by each processor 4, to know the number of page switching times in advance to determine whether to write data in the DRAM 5 or the MRAM 6 per thread (step S71). Subsequently, when the processor 4 executes each thread to make a request for writing data (step S72), the data is written in the DRAM 5 or the MRAM 6, which is decided in step S71 (step S73).

In the second example of FIG. 13, the OS analyzes a program of each page table entry to be executed by each processor 4, to know the number of page switching times in advance to determine whether to write data in the DRAM 5 or the MRAM 6 per page table entry (step S81). Subsequently, when the processor 4 executes each page table entry to make a request for writing data (step S82), the data is written in the DRAM 5 or the MRAM 6, which is decided in step S81 (step S83).

As described above, in the fifth embodiment, when there is a write request from each processor 4 to the main memory 7, the allocation process is performed to select either the DRAM 5 or the MRAM 6 and write data in the selected one, by means of software. Therefore, it is not required to largely change the hardware in the processor system 3, and hence parts cost can be reduced. Moreover, by performing the allocation process by means of software, actual contents of the allocation process can be flexible. For example, before the processor 4 executes each thread, a program to be executed by the processor 4 is analyzed in advance to determine whether to write data in the DRAM 5 or the MRAM 6 per thread. In this way, the allocation process can be performed quickly.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A memory control circuitry comprising:
    a write destination selector to select either a volatile memory or a non-volatile memory in a first storage as a write destination, for an address area in the first storage written by a processor;
    a write controller to write data in the write destination selected by the write destination selector; and
    an access information register to register information selecting the volatile memory or the non-volatile memory as the write destination, and number-of-times information indicating how many times a page of successive addresses for the address area is switched, as both information being associated with each other,
    wherein, when there is a write request from the processor, the write destination selector selects the write destination based on the information registered in the access information register, and updates the information registered in the access information register, and
    wherein the access information register comprises:
        a switching times acquirer to acquire page switching times in order from a largest number of page switching times for data written to the volatile memory and to acquire a smallest number of page switching times for data written to the nonvolatile memory when there is the write request from the processor,
        a switching times determiner to determine whether the acquired page switching times for the volatile memory is larger than the acquired smallest number of page switching times for the nonvolatile memory, and
        a replacement unit to replace data in the volatile memory with data in the non-volatile memory when determined to be larger.

2. The memory control circuitry of claim 1, wherein the write destination selector updates the information in the access information register when the processor issues a write request to a write destination not registered in the access information register or when the number-of-times information in the access information register is updated.

3. The memory control circuitry of claim 1, wherein the address area is a partial storage area in the first storage, the partial storage area being accessed by a thread to be executed by the processor.

4. The memory control circuitry of claim 3, wherein a plurality of threads are provided; and
    the access information register registers physical address information identifying the address area, identification information identifying the thread, number-of-times information indicating how many times the page to be accessed by the thread is switched, and information selecting the volatile memory or the non-volatile memory as the write destination, as these information being associated with one another for the thread.

5. The memory control circuitry of claim 1, wherein the address area is a partial storage area in the first storage, the partial storage area being accessed with address conversion information converting a virtual address group for accessing the page into a physical address group.

6. The memory control circuitry of claim 5, wherein the access information register registers physical address information identifying the address area, identification information identifying the thread, number-of-times information indicating how many times the page to be accessed with the address conversion information is switched, and information selecting the volatile memory or the non-volatile memory as the write destination, as these information being associated with one another for the address conversion information.

7. The memory control circuitry of claim 1, wherein the write destination selector selects either the volatile memory or the non-volatile memory as the write destination when a write request address issued by the processor is not present in a second storage having a higher access priority than the first storage.

8. The memory control circuitry of claim 1 further comprising:
    a first free-space determiner to determine whether the non-volatile memory has a free space; and
    a second free-space determiner to determine whether the volatile memory has a free space,
    wherein, when it is determined that the non-volatile memory and the volatile memory both have the free space, the write destination selector selects one memory having a larger free space of the non-volatile memory and the volatile memory as the write destination, when it is determined that the non-volatile memory has the free space and the volatile memory has no free space, the write destination selector selects the non-volatile memory as the write destination, and when it is determined that the volatile memory has the free space and the non-volatile memory has no free space, the write destination selector selects the volatile memory as the write destination.

9. The memory control circuitry of claim 1,
    wherein the access information register sorts data stored in the volatile memory per address area based on the number-of-times information, and
    wherein the write controller moves data of an address area of a page of a larger number of switching times, to the non-volatile memory based on data per the sorted address area.

10. The memory control circuitry of claim 1 further comprising an average value detector to count switching times of the page per address area for a predetermined period of time and obtains an average value of the switching times of the page,
    wherein the write destination selector selects either the volatile memory or the non-volatile memory as the write destination by comparing the switching times of the page associated with write request data from the processor with the average value.

11. The memory control circuitry of claim 10, wherein, when the switching times of the page associated with write request data from the processor is larger than the average value, and if the non-volatile memory has a free space, the write destination selector selects the non-volatile memory as the write destination, and if the non-volatile memory has no free space, the write destination selector moves data in an address area with a smaller number of switching times of the page to the volatile memory and selects the volatile memory as the write destination, and when the switching times of the page associated with write request data from the processor is equal to or smaller than the average value, and if the volatile memory has a free space, the write destination selector selects the volatile memory as the write destination, and if the volatile memory has no free space, the write destination selector moves data in an address area with a larger number of switching times of the page to the non-volatile memory and selects the volatile memory as the write destination.

12. A memory system comprising:
a first storage comprising a non-volatile memory and a volatile memory;
a write destination selector to select either the volatile memory or the non-volatile memory in the first storage, as a write destination, for an address area in the first storage written by a processor;
a write controller to write data in the write destination selected by the write destination selector; and
an access information register to register information selecting the volatile memory or the non-volatile memory as the write destination, and number-of-times information indicating how many times a page of successive addresses for the address area is switched, as both information being associated with each other,
wherein, when there is a write request from the processor, the write destination selector selects the write destination based on the information registered in the access information register, and updates the information registered in the access information register, and
wherein the access information register comprises:
a switching times acquirer to acquire page switching times in order from a largest number of page switching times for data written to the volatile memory and to acquire a smallest number of page switching times for data written to the nonvolatile memory when there is the write request from the processor,
a switching times determiner to determine whether the acquired page switching times for the volatile memory is larger than the acquired smallest number of page switching times for the nonvolatile memory, and
a replacement unit to replace data in the volatile memory with data in the non-volatile memory when determined to be larger.

13. The memory system of claim 12, wherein the write destination selector updates the information in the access information register when the processor issues a write request to a write destination not registered in the access information register or when the number-of-times information in the access information register is updated.

14. The memory system of claim 12, wherein the address area is a partial storage area in the first storage, the partial storage area being accessed by a thread to be executed by the processor.

15. The memory system of claim 14, wherein a plurality of threads are provided; and
the access information register registers physical address information identifying the address area, identification information identifying the thread, number-of-times information indicating how many times the page to be accessed by the thread is switched, and information selecting the volatile memory or the non-volatile memory as the write destination, as these information being associated with one another for the thread.

16. The memory system of claim 12, wherein the address area is a partial storage area in the first storage, the partial storage area being accessed with address conversion information converting a virtual address group for accessing the page into a physical address group.

17. A processor system comprising:
a processor;
a first storage to be accessed by the processor, the first storage comprising a non-volatile memory and a volatile memory;
a write destination selector to select either the volatile memory or the non-volatile memory in the first storage, as a write destination, for an address area in the first storage written by a processor;
a write controller to write data in the write destination selected by the write destination selector; and
an access information register to register information selecting the volatile memory or the non-volatile memory as the write destination, and number-of-times information indicating how many times a page of successive addresses for the address area is switched, as both information being associated with each other,
wherein, when there is a write request from the processor, the write destination selector selects the write destination based on the information registered in the access information register, and updates the information registered in the access information register, and
wherein the access information register comprises;
a switching times acquirer to acquire page switching times in order from a largest number of page switching times for data written to the volatile memory and to acquire a smallest number of page switching times for data written to the nonvolatile memory when there is the write request from the processor,
a switching times determiner to determine whether the acquired page switching times for the volatile memory is larger than the acquired smallest number of page switching times for the nonvolatile memory, and
a replacement unit to replace data in the volatile memory with data in the non-volatile memory when determined to be larger.

* * * * *